Apr. 24, 1923. J. SPIJKER 1,453,199
RESILIENT WHEEL AND AIR TIRE TO BE USED THEREWITH
Filed Aug. 24, 1921
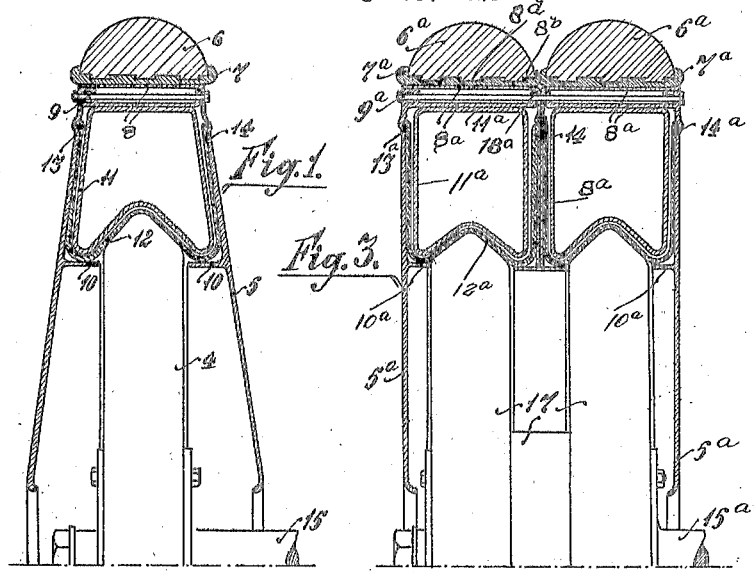
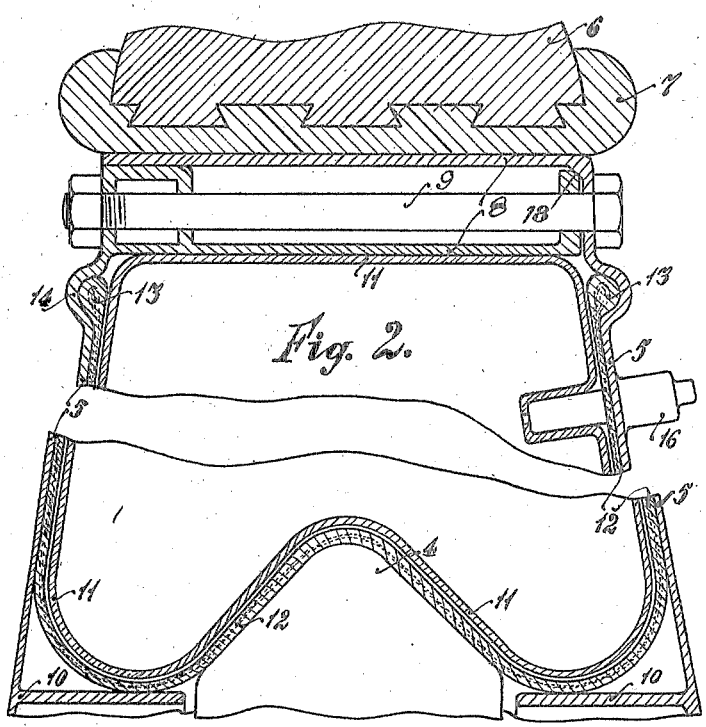
Inventor
J. Spijker
By Marks & Clerk
Attys.

Patented Apr. 24, 1923.

1,453,199

UNITED STATES PATENT OFFICE.

JACOBUS SPIJKER, OF AMSTERDAM, NETHERLANDS.

RESILIENT WHEEL AND AIR TIRE TO BE USED THEREWITH.

Application filed August 24, 1921. Serial No. 494,885.

*To all whom it may concern:*

Be it known that I, JACOBUS SPIJKER, manufacturer, subject of the Queen of the Netherlands, residing at Amsterdam, Sarphatistraat 1 D, the Netherlands, have invented certain new and useful Improvements in Resilient Wheels and Air Tires to be Used Therewith, of which the following is a specification.

This invention relates to resilient wheels and pneumatic cushioning elements to be used therewith of the type in which an inner wheel part, the circumferential portion of which is substantially V-shaped in cross section with the apex of the V directed outwards, is mounted on an axle and is connected to an outer wheel part by an air tube interposed between the inner and outer wheel parts, said outer wheel part comprising two disk-like members facing one another and supporting the solid elastic wheel tire.

The present invention has for its object to provide a resilient wheel of the type above referred to having the outer edges of the two disk members of the outer wheel so shaped that when fastened together by bolts or the like, a circular chamber is formed having a flat internal surface for the reception of the air tube and which is characterized in that the air tube is surrounded by a separate cover extending over the side walls and the opening in the inner wall of the circular chamber and leaving the air tube in free and direct contact with the flat internal surface of the chamber, said cover forming the connection between the inner and outer wheel parts.

In the accompanying drawings wherein the improved embodiment of the drawing is illustrated:

Figure 1 is a fragmentary sectional view of the wheel structure taken in a plane intersecting the axis thereof;

Fig. 2 is a view similar to Fig. 1 on an enlarged scale showing the construction and arrangement of the pneumatic cushioning element more in detail; and, Fig. 3 is a sectional view similar to Fig. 1 showing a modification of the invention adapted to a wheel of the "twin" type.

Referring to the drawing in detail, the numeral 4 indicates an inner wheel part which is carried by axle 15 of the vehicle to which the resilient wheel is applied and the circumferential portion of which is substantially V-shaped in cross section with the apex of the V directed outwardly. The outer part of the wheel is designated at 5 and is arranged about the inner part 4 and consists of opposed disk members which overlie the sides of the inner part 4 and are provided with circumferential telescoping flange portions 8 engaging each other with beveled portions 18, said flanged portions lying outwardly of the circumferential portion of the inner part 4 and constituting an inner rim and also the outer wall of the chamber formed between the inner and outer wheel parts.

The telescoping flanges 8 are separable to afford access to the chamber receiving the pneumatic cushioning element and its separate cover, as will hereinafter appear, and they are drawn together along their beveled portions 18 to maintain the wheel in assembled operative relation by bolts 9 which pass between the flanges.

The side walls of the outer wheel part 5 are formed with inwardly directed flanges 10 the edges of which lie contiguous to the sides of the inner wheel part 4 and which assist in confining the pneumatic cushioning element consisting of the inner air tube 11 and the separate protective cover or casing 12. The portion of the cover 12 lying intermediate the flanges 10 is engaged by the periphery of the inner wheel part 4 and thus when the tube 11 is inflated with air to the proper pressure, the cushioning element and its cover tend to maintain the inner and outer wheel parts 4 and 5 respectively, in concentrically spaced relation.

The air tube 11 is connected with an appropriate type of valve 16 by which it may be inflated to the desired pressure. The protective casing or covering 12 for the tube envelops that portion of the latter which is contiguous to the periphery of the inner wheel part 4, the flanges 10 and the side walls of the outer wheel part 5. The edges of the cover which are preferably tapered or reduced in thickness, have beads 13 thereon, which are anchored in the channels 14 provided internally of the outer wheel part 5, whereby the cover is secured in position, although means other than those here shown and described may be used, if desired.

A resilient tire supporting rim 7 is applied externally to the inner rim consisting of the two telescoping flanges 8 and supports a tire 6 preferably of the solid rubber type.

In use, the shocks and jolts to which the outer wheel part 5 is subjected incident to the travel of the wheel over an irregular roadway are not directly transmitted to the inner axle carried part 4, but are absorbed by the pneumatic cushioning element consisting of the tube 11 and covering 12.

In the event that repair or replacement of the parts of the pneumatic cushion are necessary, the same are readily accessible by simply removing the several bolts 9 and separating the two sections of the outer wheel part 5 whereupon the tube and its covering may be readily removed and replaced or repaired.

The double wheel illustrated in Figure 3 represents a two-fold construction, two of the air tubes as above described, but with slight modification, being employed in combination. The action of the cover and the air tube of this double construction corresponds exactly with the action of the same parts of the single wheel illustrated in Figures 1 and 2.

Referring in detail to the construction of wheel illustrated in Fig. 3, the numerals 17 indicate a pair of inner wheel parts arranged side by side upon an axle 15$^a$, the inner wheel parts being received within the outer wheel parts 5$^a$, the individual structure of each of which latter is substantially identical with the construction of the equivalent part in the form of the invention illustrated in Figs. 1 and 2.

Each of the two outer wheel parts 5$^a$ consists of opposed discs carrying circumferential telescoping flange portions 8$^a$ and upon which the tire supporting rim 7$^a$, carrying the solid tire 6$^a$, is mounted. The two outer wheel parts 5$^a$ are arranged side by side and the adjacent side members of the respective outer wheel parts are arranged in engagement and are rigidly held in operative relation by bolts 9$^a$ which latter, in addition to retaining the two outer wheel parts in assembled position also act to retain the side members of the respective outer wheel parts in operative relation. The outer side members of the respective outer wheel parts 5$^a$ are provided with flanges 10$^a$. Within each of the outer wheel parts 5$^a$ there is arranged an air tube 11$^a$ which is in operative relation to the inner wheel part 17. A protective separate cover 12$^a$ preferably reinforced with canvas or other suitable material is applied to the inner surface of each air tube 11$^a$ and its edge portions 13$^a$ may be suitably secured as indicated at 14$^a$.

This construction is more preferable for large and heavy cars and gives greater security, as each wheel section and each air tube acts independently of the other, so that in case of a break down of one wheel, the other continues to function.

The combination of a separate air tube and a loose cover therefor has special advantages and likewise the solid rim which protects the air tube against penetration and puncture by sharp objects.

The load carried by the wheel constructed according to this invention may be heavier than with the arrangements of prior constructions, so that these resilient wheels are especially suitable for vehicles carrying freight.

The improved wheel possesses great durability as the separate cover can be composed of non-extensible but pliable material, preferably having tapered ends, which cover may be reinforced with canvas and made about equal in thickness to the material of which the tube is made. The cover executes a sliding motion over the cylindrical surfaces which project from the inside surface of the outer wheel and offers more resistance against wear and tear than would be offered by the air tube alone and the cover is better adapted to take up shocks caused by heavy braking or quick starting. Furthermore the cover forms a solid connecting member between the outer and inner wheel parts, whereby a swinging or inclined displacement of the outer wheel relative to the inner wheel is prevented.

Finally, the cover protects the air tube and the outer wheel against moisture and dirt, so that rusting and rotting are prevented, while the air tube itself, due to its effective supporting, which it receives from the walls of the chamber in the outer wheel part and from the cover, furnishes a resiliency that is very efficient.

What I claim is:

1. A resilient wheel of the character described comprising an outer wheel part including two disk-members having an internal circular chamber open at its inner side, an outer solid rim portion, said disk-like members having telescoping circumferential flanges, an inner wheel part, an air tube located in said chamber, and a separate cover overlying the inner surfaces of the side walls of the chamber and extending across the inner open side thereof, said cover forming a connection between the inner and outer wheel parts and the outer portion of said air tube being in direct contact with the rim portion of the outer wheel part.

2. A resilient wheel of the character described comprising an outer wheel part including two disk members having an internal circular chamber open at its inner side, an outer solid rim portion, said disk-like members having telescoping circumferential flanges, said flanges having the contacting portions thereof beveled, an inner wheel part, an air tube located in said chamber, and a separate cover overlying the inner surface of the side walls of the chamber and extending across the inner open side thereof, said cover forming a connection between the inner and outer wheel parts and the outer portion of said air tube being in direct contact with the rim portion of the outer wheel part.

3. A resilient wheel as claimed in claim 1 characterized in that the separate cover is formed of pliable and non extensible material of approximately the thickness of the material of the air tube and having tapered edges.

4. A resilient wheel as claimed in claim 2 characterized in that the separate cover is formed of pliable and non-extensible material of approximately the thickness of the material of the air tube and having tapered edges.

In testimony whereof I affix my signature.

JACOBUS SPIJKER.